United States Patent
Takei et al.

(10) Patent No.: US 10,215,631 B2
(45) Date of Patent: Feb. 26, 2019

(54) CONFOCAL DISPLACEMENT SENSOR

(71) Applicant: Keyence Corporation, Osaka (JP)

(72) Inventors: Hideto Takei, Osaka (JP); Tomikazu Sakaguchi, Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 15/981,927

(22) Filed: May 17, 2018

(65) Prior Publication Data

US 2018/0356284 A1     Dec. 13, 2018

(30) Foreign Application Priority Data

Jun. 13, 2017   (JP) ................................ 2017-115554

(51) Int. Cl.
*G01J 3/02* (2006.01)
*G01J 3/28* (2006.01)
(Continued)

(52) U.S. Cl.
CPC .............. *G01J 3/0208* (2013.01); *G01J 3/024* (2013.01); *G01J 3/0243* (2013.01); *G01J 3/10* (2013.01);
(Continued)

(58) Field of Classification Search
CPC ..... G01B 11/026; G01J 3/0208; G01J 3/0218; G01J 3/024; G01J 3/10
(Continued)

(56) References Cited

U.S. PATENT DOCUMENTS

| | | | | |
|---|---|---|---|---|
| 5,737,084 A | * | 4/1998 | Ishihara | G01B 11/026 356/609 |
| 5,785,651 A | * | 7/1998 | Kuhn | G01B 11/026 250/339.06 |

(Continued)

OTHER PUBLICATIONS

U.S. Appl. No. 15/981,924, filed May 17, 2018 (63 pages).
(Continued)

*Primary Examiner* — Roy M Punnoose
(74) *Attorney, Agent, or Firm* — Kilyk & Bowersox, P.L.L.C.

(57) ABSTRACT

To provide a confocal displacement sensor that can prevent deterioration in measurement accuracy due to a spherical aberration of an optical member. The confocal displacement sensor includes a light source for light projection configured to generate light having a plurality of wavelengths, a pinhole configured to emit detection light by allowing the light emitted from the light source for light projection to pass, an optical member configured to generate an axial chromatic aberration in the detection light emitted via the pinhole and converge the detection light toward the measurement object, a measurement control section configured to calculate displacement of the measurement object on the basis of, in the detection light irradiated on the measurement object via the optical member, detection light passed through the pinhole by being reflected while focusing on the measurement object, and a head housing configured to house the pinhole and the optical member. The optical member includes a first diffraction lens configured to diffract the detection light and a first refraction lens configured to refract the detection light. The first diffraction lens is disposed with a non-diffraction surface exposed from the head housing.

11 Claims, 8 Drawing Sheets

(51) Int. Cl.
    *G01J 3/10*      (2006.01)
    *G01J 3/14*      (2006.01)
    *G01B 11/02*     (2006.01)

(52) U.S. Cl.
    CPC .............. *G01J 3/14* (2013.01); *G01J 3/2823* (2013.01); *G01B 11/026* (2013.01)

(58) Field of Classification Search
    USPC .................................................. 356/614, 624
    See application file for complete search history.

(56) References Cited

U.S. PATENT DOCUMENTS

| | | | | |
|---|---|---|---|---|
| 8,427,644 | B2 * | 4/2013 | Miki | G01B 11/026 356/364 |
| 8,773,757 | B2 * | 7/2014 | Chen | G02B 21/0032 359/368 |
| 9,541,376 | B2 * | 1/2017 | Kubo | G02B 21/0064 |
| 2006/0109483 | A1 * | 5/2006 | Marx | G01B 11/0608 356/609 |
| 2010/0208486 | A1 * | 8/2010 | Gladnick | G01B 11/026 362/551 |
| 2011/0013186 | A1 * | 1/2011 | Miki | G01B 11/026 356/364 |
| 2012/0019821 | A1 * | 1/2012 | Chen | G02B 21/0032 356/303 |
| 2014/0236022 | A1 * | 8/2014 | Zeng | A61B 1/00172 600/476 |
| 2015/0185454 | A1 * | 7/2015 | Kalkbrenner | G02B 21/0032 250/550 |
| 2016/0249812 | A1 * | 9/2016 | Wang | A61B 5/0059 600/407 |

OTHER PUBLICATIONS

U.S. Appl. No. 15/981,925, filed May 17, 2018 (84 pages).
U.S. Appl. No. 15/989,215, filed May 25, 2018 (162 pages).
U.S. Appl. No. 15/989,216, filed May 25, 2018 (147 pages).

* cited by examiner

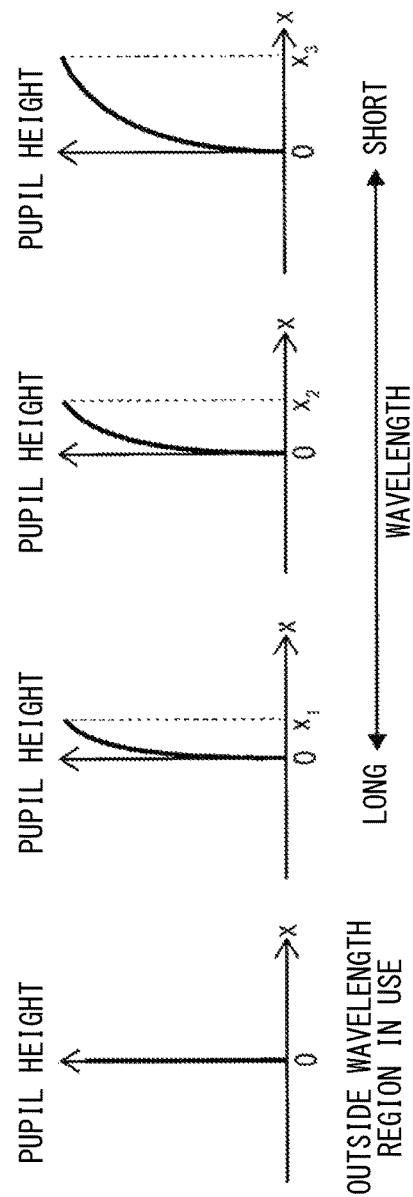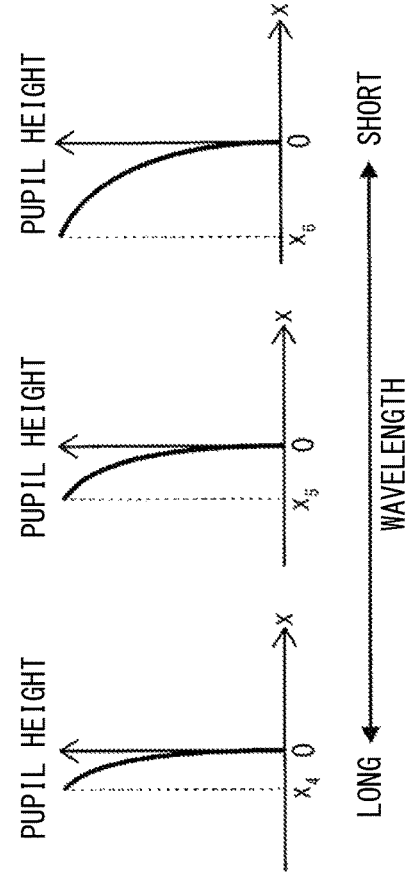

CONFOCAL DISPLACEMENT SENSOR

CROSS-REFERENCE TO RELATED APPLICATIONS

The present application claims foreign priority based on Japanese Patent Application No. 2017-115554, filed Jun. 13, 2017, the contents of which is incorporated herein by reference.

BACKGROUND OF THE INVENTION

1. Field of the Invention

The present invention relates to a confocal displacement sensor and, more particularly, to improvement of a confocal displacement sensor that measures displacement of a measurement object using a confocal optical system.

2. Description of Related Art

A confocal displacement sensor is an optical measurement device that measures displacement of a measurement object making use of a confocal principle of stopping down received light into reflected light from an image forming surface on which an image of a light source is formed and a phenomenon of an axial chromatic aberration in which a color drift in an optical axis direction occurs in the image of the light source.

The confocal displacement sensor is configured by a pinhole that emits, as a point light source, light emitted from a light source, an optical member that causes an axial chromatic aberration in detection light emitted via the pinhole and converges the detection light toward the measurement object, and a measurement control section that calculates displacement of the measurement object on the basis of reflected light from the measurement object. As the detection light, light having a plurality of wavelengths, for example, white light is used. The pinhole allows, in the detection light irradiated on the measurement object via the optical member, detection light having a wavelength reflected while focusing on the measurement object to pass.

The position of the image forming surface is different for each wavelength according to the axial chromatic aberration. Therefore, displacement of the measurement object is calculated by specifying a wavelength of the detection light passed through the pinhole. The displacement is the distance in the optical axis direction from a predetermined reference position to the measurement object. The depth or the height of unevenness on a surface, the thickness of a transparent body, and the like can be measured by calculating the displacement.

In the confocal displacement sensor in the past explained above, since a spherical aberration of an optical lens configuring the optical member is greatly different depending on a wavelength component of the detection light, the spherical aberration can be only minimized with respect to a specific wavelength component. Therefore, an image on the image forming surface is blurred depending on a wavelength component and measurement accuracy is deteriorated.

SUMMARY OF THE INVENTION

The present invention has been devised in view of the circumstances, and an object of the present invention is to provide a confocal displacement sensor that can prevent deterioration in measurement accuracy due to a spherical aberration of an optical member. In particular, an object of the present invention is to provide a confocal displacement sensor that can prevent spherical aberrations over a wide wavelength band.

A confocal displacement sensor according to a first aspect of the present invention is a confocal displacement sensor that measures displacement of a measurement object using a confocal optical system. The confocal displacement sensor includes: a light source for light projection configured to generate light having a plurality of wavelengths; a pinhole configured to emit detection light by allowing the light emitted from the light source for light projection to pass; an optical member configured to generate an axial chromatic aberration in the detection light emitted via the pinhole and converge the detection light toward the measurement object; a measurement control section configured to calculate displacement of the measurement object on the basis of, in the detection light irradiated on the measurement object via the optical member, detection light passed through the pinhole by being reflected while focusing on the measurement object; and a head housing configured to house the pinhole and the optical member. The optical member includes a first diffraction lens configured to diffract the detection light and a first refraction lens configured to refract the detection light. The first diffraction lens is disposed with a non-diffraction surface exposed from the head housing.

In the confocal displacement sensor, spherical aberrations of the first diffraction lens and the first refraction lens are cancelled making use of the fact that polarities of the spherical aberrations are different in the lenses. Therefore, it is possible to prevent spherical aberrations over a wide wavelength band.

In a second aspect of the present invention, in addition to the configuration explained above, in the confocal displacement sensor, the first refraction lens may be configured from an aspherical lens, a lens surface of which is aspherical. With such a configuration, since a spherical aberration of the first refraction lens is prevented, it is possible to facilitate optical design of the optical member including the first diffraction lens.

In a third aspect of the present invention, in addition to the configuration explained above, in the confocal displacement sensor, the optical member may include a second diffraction lens or a second refraction lens disposed substantially coaxially with the first refraction lens and disposed further on the pinhole side than the first refraction lens.

With such a configuration, it is possible to adjust spherical aberrations in the first refraction lens and the second diffraction lens or the second refraction lens. Therefore, it is possible to further facilitate the optical design of the optical member including the first diffraction lens.

In a fourth aspect of the present invention, in addition to the configuration explained above, the confocal displacement sensor may further include a fiber cable including an optical fiber for transmitting the light emitted from the light source for light projection to the head housing, an end face of the optical fiber functioning as the pinhole. With such a configuration, it is possible to set the head housing apart from the light source for light projection and the measurement control section.

In a fifth aspect of the present invention, in addition to the configuration explained above, in the confocal displacement sensor, the head housing may include an opening frame section that surrounds the first diffraction lens and projects further to the measurement object side than the non-diffraction surface. With such a configuration, since the non-diffraction surface of the first diffraction lens is protected by the opening frame section, it is possible to prevent the non-diffraction surface of the first diffraction lens from being scratched and stained, for example, when the head housing is set.

In a sixth aspect of the present invention, in addition to the configuration explained above, in the confocal displacement sensor, the non-diffraction surface of the first diffraction lens may be formed of a glass material and a diffraction surface having undulation of the first diffraction lens may be formed of a resin material. With such a configuration, it is possible to facilitate formation of the diffraction surface while preventing damage to the non-diffraction surface of the first diffraction lens.

According to the present invention, spherical aberrations of the first diffraction lens and the first refraction lens are cancelled making use of the fact that polarities of the spherical aberrations are different in the lenses. Therefore, it is possible to prevent spherical aberrations over a wide wavelength band. Therefore, it is possible to prevent deterioration in measurement accuracy due to a spherical aberration of the optical member.

BRIEF DESCRIPTION OF THE DRAWINGS

FIGS. 7A and 7B are diagrams showing a relation between the spherical aberration and the pupil height concerning different three wavelengths of incident light;

DESCRIPTION OF EMBODIMENTS

An embodiment of the present invention is explained below with reference to the drawings. In this specification, for convenience, a direction of an optical axis of a head unit is explained as an up-down direction. However, a posture and a direction during use of the head unit are not limited.

Confocal Displacement Sensor 1

Figure 1:
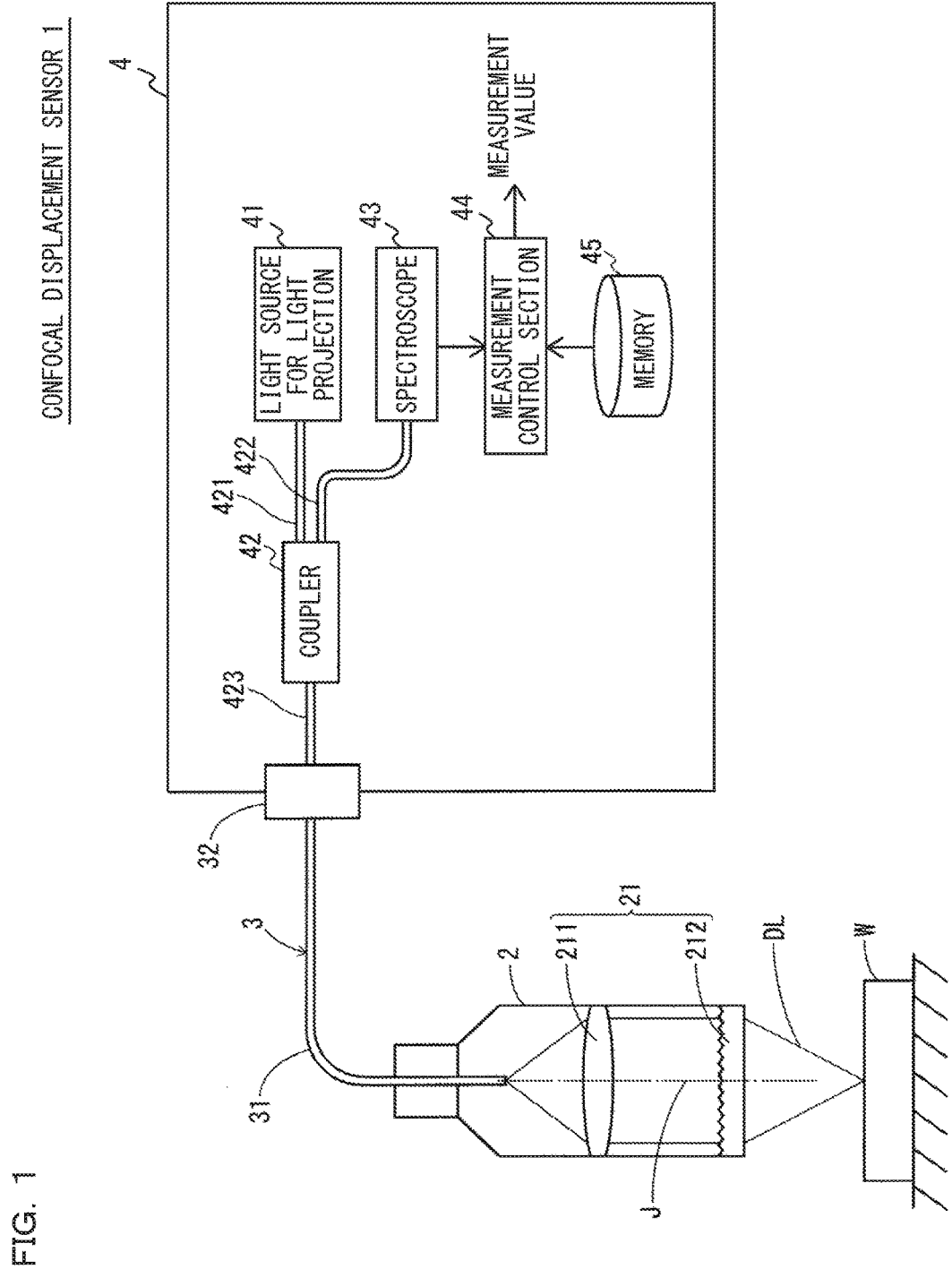
FIG. 1 is a system diagram showing a configuration example of a confocal displacement sensor according to an embodiment of the present invention.

FIG. 1 is a system diagram showing a configuration example of a confocal displacement sensor 1 according to the embodiment of the present invention. The confocal displacement sensor 1 is an optical measurement device configured by a head unit 2, a fiber cable 3, and a control device 4. The optical measurement device receives reflected light from a measurement object W when detection light DL is emitted from the head unit 2 and measures displacement of the measurement object W.

The head unit 2 and the control device 4 are connected to each other via the fiber cable 3. The fiber cable 3 includes an optical fiber 31 that transmits light for light projection. A connector 32 is provided at one end of the fiber cable 3. The connector 32 is detachably connected to the control device 4.

The head unit 2 is an optical unit that emits the detection light DL toward the measurement object W. Reflected light from the measurement object W is made incident on the optical unit. The head unit 2 includes an optical member 21 including a refraction lens 211 and a diffraction lens 212. The optical member 21 causes an axial chromatic aberration in the detection light DL emitted via an end face of the optical fiber 31 and converges the detection light DL toward the measurement object W. The axial chromatic aberration is a color drift of an image in an optical axis direction due to dispersion.

In the confocal displacement sensor 1, the light for light projection is transmitted to the head unit 2 via the optical fiber 31. An irradiation spot is formed on the measurement object W by the detection light DL emitted from the head unit 2. The emission end face of the optical fiber 31 functions as a pinhole that allows light emitted from a light source for light projection 41 to pass to be a point light source that emits the detection light DL. The emission end face of the optical fiber 31 also functions as a pinhole that allows detection light having a wavelength reflected while focusing on the measurement object W in the detection light DL irradiated on the measurement object W via the optical member 21.

The control device 4 is a processing unit that controls projected and received lights and calculates displacement of the measurement object W on the basis of reflected light corresponding to the irradiation spot. The control device 4 is configured by the light source for light projection 41, a coupler 42, a spectroscope 43, a measurement control section 44, and a memory 45. The light source for light projection 41 is a light source device that generates light having a plurality of wavelengths, for example, white light as the light for light projection.

The coupler 42 is a directive coupler that outputs light input from the light source for light projection 41 toward the head unit 2 and, on the other hand, outputs the detection light DL input from the head unit 2 toward the spectroscope 43. The coupler 42 is a Y coupler, from one end of which two optical fibers 421 and 422 extend and from the other end of which one optical fiber 423 extends.

Light emitted from the light source for light projection 41 is input to an incident end of the optical fiber 421 and output to the optical fiber 31 via the optical fiber 423 and the connector 32. On the other hand, the detection light DL reflected by the measurement object W is input to the optical fiber 423 via the optical fiber 31 and the connector 32 and emitted toward the spectroscope 43 from an emission end of the optical fiber 422.

The spectroscope 43 spectrally disperses the detection light DL passed through the emission end face of the optical fiber 31 and generates a light reception signal. The measurement control section 44 controls the light source for light projection 41 on the basis of the light reception signal of the spectroscope 43 and adjusts the intensity of light for light projection, an exposure time in receiving reflected light, and a gain in amplifying a light reception signal.

The measurement control section 44 calculates displacement of the measurement object W on the basis of the light reception signal generated by the spectroscope 43 and outputs the displacement of the measurement object W to a not-shown display device and a not-shown external device as a measurement value. Specifically, the measurement control section 44 acquires a light reception waveform representing light reception intensity for each wavelength from the spectroscope 43 and specifies a peak position of the light reception waveform to thereby calculate displacement of the measurement object W. The peak position is a pixel position where the light reception intensity is the largest. The peak position corresponds to a specific wavelength. Measurement conditions and various kinds of correction information are retained in the memory 45.

Note that an X coupler may be used as the coupler 42. In the X coupler, reflection by an end face is easily prevented compared with the Y coupler. Such an optical fiber coupler is a fusion-type coupler to which a plurality of optical fibers are fused. However, the optical fiber coupler may be a coupler of a type that divides light using a beam splitter.

Head Unit 2

Figure 2:
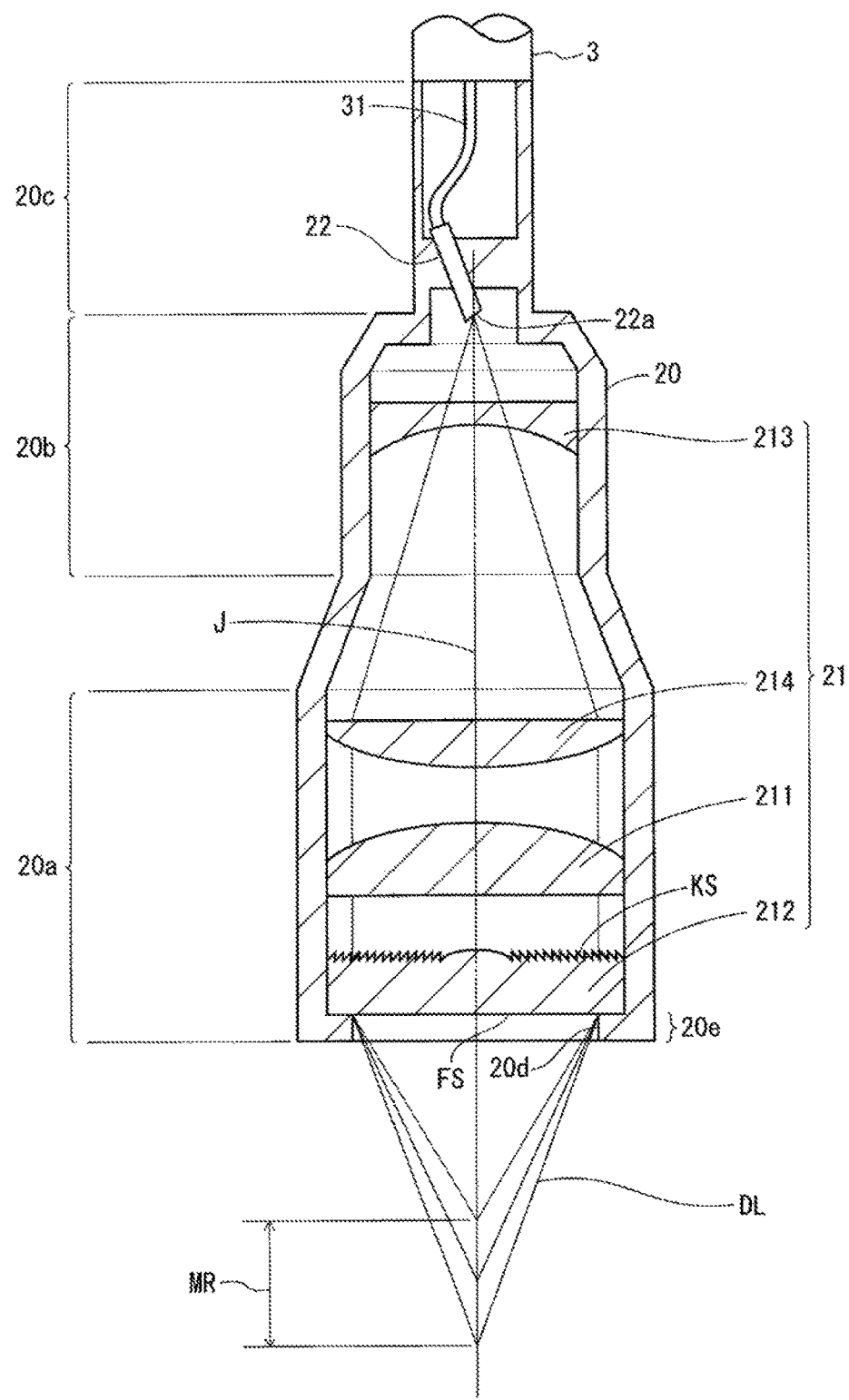
FIG. 2 is a sectional view schematically showing a configuration example of a head unit shown in FIG. 1.

FIG. 2 is a sectional view schematically showing a configuration example of the head unit 2 shown in FIG. 1. A cut surface of the head unit 2 cut along a plane including an optical axis J is shown. The head unit 2 is configured by a head housing 20, the optical member 21, and an optical fiber ferrule 22.

The head housing 20 is a lens barrel member that houses the optical member 21 and the optical fiber ferrule 22. The head housing 20 is formed in, for example, a covered cylindrical shape having the optical axis J as a center axis. The diameter of the head housing 20 changes along the optical axis J. The distal end side of the head housing 20 is a large diameter section 20a and a root side of the head housing 20 is a small diameter section 20b having a diameter smaller than the diameter of the large diameter section 20a. The small diameter section 20b is a metal fitting attachment section to which a metal fitting of a jig that supports the head unit 2 is attached. A section between the small diameter section 20b and the distal end of the fiber cable 3 is a connecting section 20c.

The optical member 21 is configured by the refraction lens 211, the diffraction lens 212, and refraction lenses 213 and 214. The refraction lenses 213, 214, and 211 and the diffraction lens 212 are arrayed in this order.

The refraction lenses 211, 213, and 214 are optical lenses that condense or diffuse incident light making use of a light refraction phenomenon. The refraction lenses 211, 213, and 214 refract the detection light DL emitted via the emission end face of the optical fiber 31.

The refraction lens 211 is an aspherical lens, at least one lens surface of which of two lens surfaces crossing the center axis is formed by an aspherical curved surface. The aspherical lens is an optical element having a small spherical aberration compared with a spherical lens. The refraction lens 211 is disposed in a state in which the center axis is aligned with the optical axis J. A lens surface on the upper side has a convex surface shape and a lens surface on the lower side has a flat surface shape.

The diffraction lens 212 is an optical element that condenses or diffuses incident light making use of a light diffraction phenomenon. The diffraction lens 212 diffracts the detection light DL emitted via the emission end face of the optical fiber 31. The diffraction lens 212 is a relief-type diffraction lens. A lens surface on the upper side on which the detection light DL is made incident is a diffraction surface KS. A fine relief (undulation) is formed on the diffraction surface KS. The depth in the optical axis direction of the relief is approximately a wavelength of light. A plurality of annular patterns centering on the optical axis J are disposed on the relief. A lens surface on the lower side of the diffraction lens 212 is a flat non-diffraction surface FS. Note that, as the diffraction lens 212, a diffraction lens of an amplitude type formed by changing the transmittance of light in the radial direction centering on the optical axis may be used.

The diffraction lens 212 is disposed substantially coaxially with the refraction lens 211 and disposed in a position most distant from the emission end of the optical fiber 31 in the optical member 21. The diffraction lens 212 is disposed to expose the non-diffraction surface FS via an opening for light projection 20d of the head housing 20. The opening for light projection 20d is a lower end opening of the large diameter section 20a. The diffraction surface KS is opposed to a flat lens surface of the refraction lens 211.

By disposing the diffraction lens 212 with the non-diffraction surface FS exposed from the head housing 20 and with the diffraction surface KS directed to the inside of the head housing 20, it is possible to prevent foreign matters such as dust from adhering to the diffraction surface KS and prevent the diffraction surface KS from being scratched. Therefore, it is unnecessary to dispose a lens and a cover glass for protection further on the measurement object side than the diffraction lens 212. Therefore, it is possible to obtain a satisfactory optical characteristic.

In the large diameter section 20a of the head housing 20, an opening frame section 20e that surrounds the diffraction lens 212 and projects further to the measurement object W side than the non-diffraction surface FS of the diffraction lens 212 is provided. The opening frame section 20e is formed in a shape in which a part of the head housing 20 surrounding the diffraction lens 212 extends along the optical axis J and extends to the inner side in the radial direction along the non-diffraction surface FS of the diffraction lens 212.

By providing such an opening frame section 20e, the non-diffraction surface FS of the diffraction lens 212 is protected by the opening frame section 20e. Therefore, when the head housing 20 is set, it is possible to prevent the non-diffraction surface FS of the diffraction lens 212 from being scratched and stained.

The refraction lenses 213 and 214 are disposed substantially coaxially with the refraction lens 211 and disposed further on the emission end side of the optical fiber 31 than the refraction lens 211. The refraction lens 213 is an optical lens opposed to the emission end of the optical fiber 31. The refraction lens 213 is disposed in a position closest to the emission end of the optical fiber 31 in the optical member 21. The refraction lens 213 is disposed in the small diameter section 20b in a state in which the center axis is aligned with the optical axis J. A lens surface on the upper side has a flat surface shape. A lens surface on the lower side has a concave surface shape.

The refraction lens 214 is an optical lens opposed to the refraction lens 213 and disposed substantially coaxially with the refraction lens 213. A lens surface on the upper side has a flat surface shape. A lens surface on the lower side has a convex surface shape.

The refraction lenses 214 and 211 and the diffraction lens 212 are disposed in the large diameter section 20a. Note that all of the refraction lenses 211, 213, and 214 are single lenses. However, the refraction lenses 211, 213, and 214 may be doublet lenses or lens groups each obtained by combining a plurality of optical lenses. A cover glass, an attachment, or a transparent film for protection may be disposed further on the measurement object side than the diffraction lens 212.

The optical fiber ferrule 22 is a holding member that holds the optical fiber 31 configuring the fiber cable 3. The emission end of the optical fiber 31 is held by a resin member. The optical fiber ferrule 22 is disposed to be projected to the lower side from a top lid section of the head housing 20.

The optical fiber 31 is configured by a core and a clad. An end face of the core functions as a pinhole. That is, the end face of the core of the optical fiber 31 has a sufficiently small diameter compared with a space in which the emission end of the optical fiber 31 is disposed. The end face of the core of the optical fiber 31 can selectively allow light made incident via the optical member 21 to pass. The refraction lenses 211, 213, and 214 are disposed between the optical fiber ferrule 22 and the diffraction lens 212. The emission end face of the optical fiber 31 and the optical member 21 configure a confocal optical system.

The confocal optical system stops down received light making use of a confocal principle and causes an axial chromatic aberration in the detection light DL. Therefore, the detection light DL emitted from the emission end face of the optical fiber 31 and transmitted through the optical member 21 focuses on a different position in the up-down direction according to a wavelength. Among wavelength components included in the detection light DL, a specific wavelength component focusing on the measurement object W is reflected by the measurement object W. Reflected light of the specific wavelength component is transmitted through the optical member 21 and focuses on the emission end face of the optical fiber 31. On the other hand, reflected light corresponding to wavelength components other than the specific wavelength component is blocked without focusing on the emission end face of the optical fiber 31.

In the confocal displacement sensor 1, in order to prevent measurement accuracy from being deteriorated by the influence of light reflected on the emission end face of the optical fiber 31, an emission end face 22a of the optical fiber ferrule 22 is obliquely machined. That is, the emission end face 22a is formed as an inclined surface inclined with respect to a plane perpendicular to the center axis of the optical fiber ferrule 22. The inclination of the emission end face 22a is formed by, for example, polishing. The optical fiber ferrule 22 is disposed with the center axis thereof inclined with respect to the optical axis J considering refraction that occurs when the detection light DL passes through the emission end face of the optical fiber 31.

The distance from the head unit 2 to the measurement object W is, for example, approximately 10 mm to 70 mm. The measurement range MR is approximately 1 mm to 20 mm. The measurement range MR corresponds to a band width of the detection light DL. In order to secure a wide measurement range MR, the detection light DL in a wide band is used. The detection light DL includes, for example, a wavelength component of 500 nm to 700 nm.

Diffraction Lens 212

Figure 3:
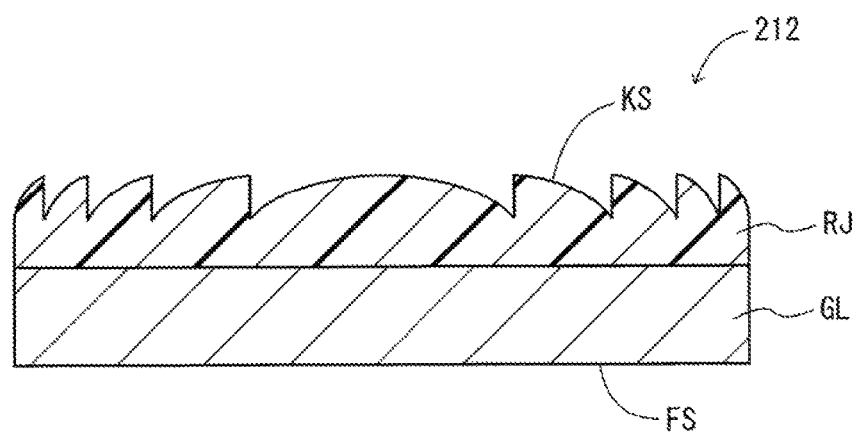
FIG. 3 is a sectional view showing a configuration example of a diffraction lens shown in FIG. 2.

FIG. 3 is a sectional view showing a configuration example of the diffraction lens 212 shown in FIG. 2 and showing a cut surface of the diffraction lens 212 cut along a plane including the optical axis J. The diffraction lens 212 is formed by a flat plate obtained by forming a resin layer RJ formed of a resin material on a glass substrate GL formed of a glass material. The lower surface of the glass substrate GL is the non-diffraction surface FS. The diffraction surface KS is formed by machining undulation in a concentric shape on the upper surface of the resin layer RJ.

Since a glass surface has high hardness compared with a resin surface, it is possible to prevent damage to the non-diffraction surface FS. On the other hand, the resin surface is easily machined compared with the glass surface. Therefore, it is possible to facilitate formation of the diffraction surface KS while preventing damage to the non-diffraction surface FS of the diffraction lens 212.

Light Source for Light Projection 41

Figure 4A:
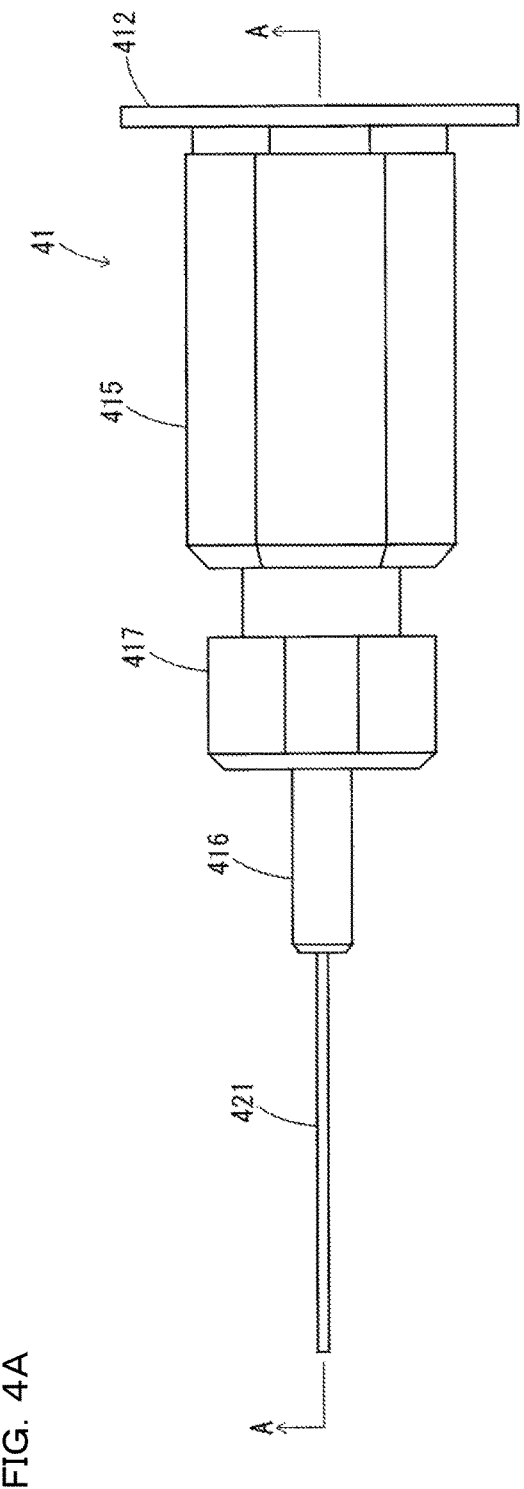
FIGS. 4A and 4B are diagrams showing a configuration example of a light source for light projection shown in FIG. 1.
Figure 4B:
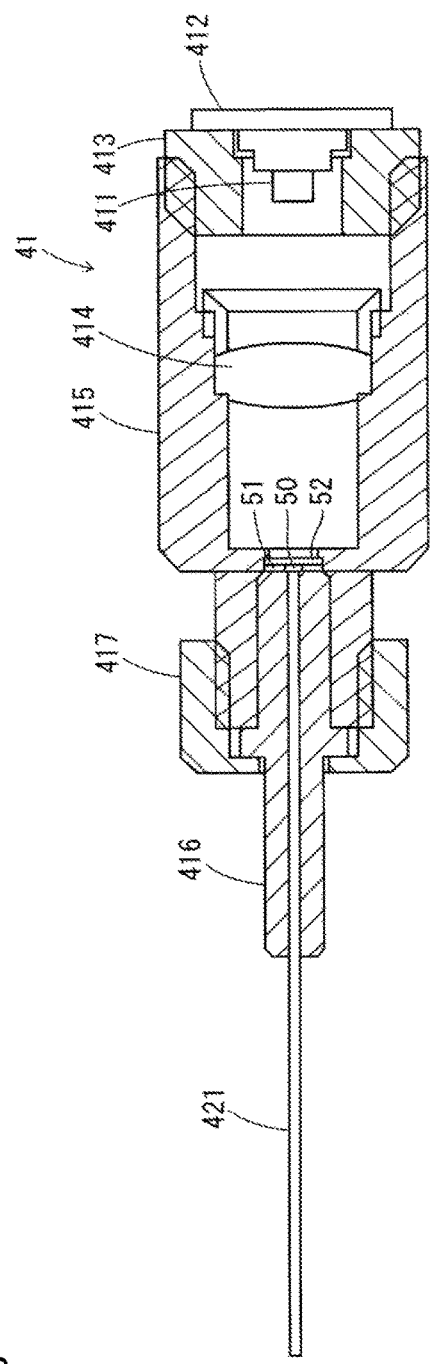

FIGS. 4A and 4B are diagrams showing a configuration example of the light source for light projection 41 shown in FIG. 1. In FIG. 4A, a side surface of the light source for light projection 41 is shown. In FIG. 4B, a cut surface of the light source for light projection 41 cut along an A-A cut line is shown. The light source for light projection 41 is a light source device that irradiates laser light on a phosphor and causes the phosphor to generate white light. The light source for light projection 41 is configured by a light emitting element 411, a wiring board 412, an element holder 413, a condensing lens 414, a lens holder 415, a ferrule 416, a ferrule retainer 417, a phosphor 50, a frame body 51, and a filter element 52.

The light emitting element 411 is a semiconductor light emitting element such as a laser diode (LD). The light emitting element 411 generates laser light having a single wavelength. The light emitting element 411 is disposed on the wiring board 412 in a state in which a light emitting section is directed forward in the horizontal direction. For example, the light emitting element 411 generates blue light or ultraviolet light having a wavelength of 450 nm or less. The element holder 413 is a member that holds the wiring board 412. The element holder 413 is inserted into the lens holder 415 from the rear surface side.

The condensing lens 414 is an optical member that condenses laser light emitted from the light emitting element 411 to the incident end of the optical fiber 421. The condensing lens 414 is disposed to be opposed to the light emitting element 411. The lens holder 415 is a lens barrel that holds the condensing lens 414. The lens holder 415 is reduced in diameter in front of the condensing lens 414. The ferrule 416 is a cylindrical connection member in which the incident end of the optical fiber 421 is incorporated. The cylindrical connection member extends in the front-rear direction. The ferrule retainer 417 is a bottomed cylindrical member for fixing the ferrule 416 inserted into a reduced-diameter section of the lens holder 415 from the front surface side. The ferrule retainer 417 is attached to the lens holder 415 in a state in which a cylindrical section is put on the outer circumferential surface of the reduced-diameter section.

The phosphor 50 is a light emitting body that is excited by laser light emitted from the light emitting element 411 to generate fluorescent light having a wavelength different from the laser light. The phosphor 50 is disposed in the lens holder 415 in a state in which the outer circumferential surface of the phosphor 50 is held by the frame body 51 and the phosphor 50 is set in contact with the incident end face of the optical fiber 421. For example, the phosphor 50 generates yellow fluorescent light with irradiation of blue laser light. Note that the phosphor 50 may be formed of two or more kinds of fluorescent materials. For example, the phosphor 50 is formed of a fluorescent material that generates green fluorescent light with the irradiation of the blue laser light and a fluorescent material that generates red fluorescent light with the irradiation of the blue laser light.

The filter element 52 is an optical member that transmits laser light emitted from the light emitting element 411 and reflects fluorescent light emitted from the phosphor 50. The filter element 52 is disposed to cover the surface on the light emitting element side of the frame body 51. Light having a plurality of wavelengths obtained by mixing the laser light emitted from the light emitting element 411 and the fluorescent light emitted from the phosphor 50 is made incident on the incident end of the optical fiber 421.

The light source for light projection 41 is configured to make the light obtained by mixing the laser light emitted from the light emitting element 411 and the fluorescent light emitted from the phosphor 50 directly incident on the incident end of the optical fiber 421. By using such a fiber-type light source, it is possible to simplify connection to the fiber cable 3 between the head unit 2 and the control device 4.

Note that, as the light source for light projection 41, a light source that generates light in a wide band, for example, a halogen lamp, an SC light source that generates super-continuum (SC) light, or a super-luminescent diode (SLD) may be used. The light source for light projection 41 may be a normal white LED. The SC light source generates laser light in a continuous and wide band with a nonlinear optical effect by a pulse laser.

Spectroscope 43

Figure 5:
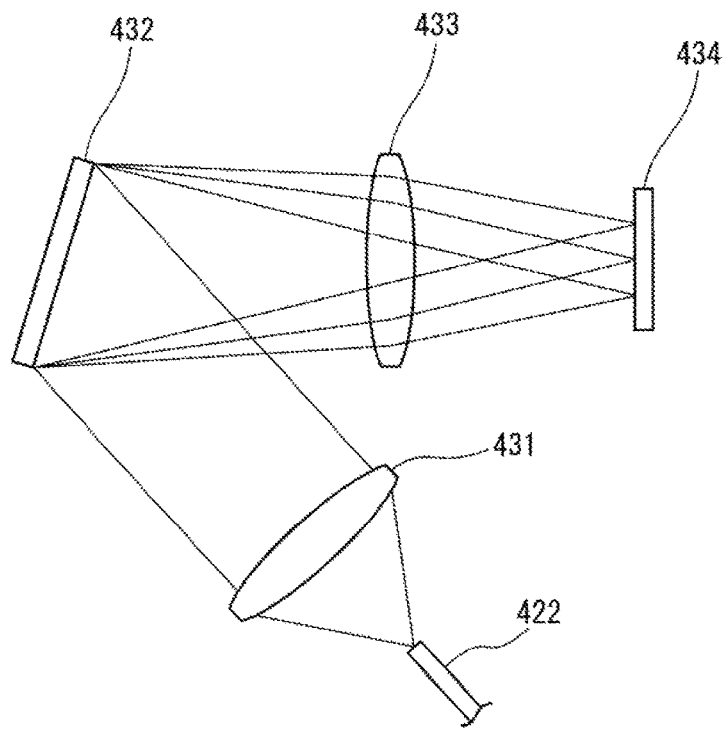
FIG. 5 is an explanatory diagram schematically showing a configuration example of a spectroscope shown in FIG. 1.

FIG. 5 is an explanatory diagram schematically showing a configuration example of the spectroscope 43 shown in FIG. 1. The spectroscope 43 of a reflection type is shown. The spectroscope 43 is configured by a collimator lens 431, a diffraction grating 432, an imaging lens 433, and an image sensor 434. The spectroscope 43 spectrally disperses the detection light DL emitted from the emission end of the optical fiber 422 of the coupler 42.

The emission end of the optical fiber 422, the diffraction grating 432, and the image sensor 434 are disposed to be directed to, for example, the horizontal direction. The collimator lens 431 is an optical lens for obtaining parallel light. The collimator lens 431 is disposed to be opposed to the emission end face of the optical fiber 422.

The diffraction grating 432 is a color dispersing element of a reflection type that reflects the detection light DL at a different angle according to a wavelength. The diffraction grating 432 is formed in a flat shape. The imaging lens 433 focuses the detection light DL spectrally dispersed by the diffraction grating 432 on the image sensor 434. Note that both of the collimator lens 431 and the imaging lens 433 are single lenses. However, the collimator lens 431 and the imaging lens 433 may be doublet lenses each obtained by combining a plurality of optical lenses.

The image sensor 434 is, for example, a one-dimensional line image sensor extending in the horizontal direction. A large number of light receiving elements are linearly arrayed on the image sensor 434. A light reception waveform is formed by light reception signals of the light receiving elements. Note that an imaging element on which a large number of light receiving elements are two-dimensionally arrayed may be used as the image sensor 434.

In order to prevent light made incident on the image sensor 434 from being regularly reflected on a light receiving surface, reflected by the diffraction grating 432, and received again, the diffraction grating 432 is disposed to be slightly tilted from a state in which the diffraction grating 432 is right opposed to the light receiving surface of the image sensor 434. Note that the detection light DL may be spectrally dispersed using a prism.

Figure 6:
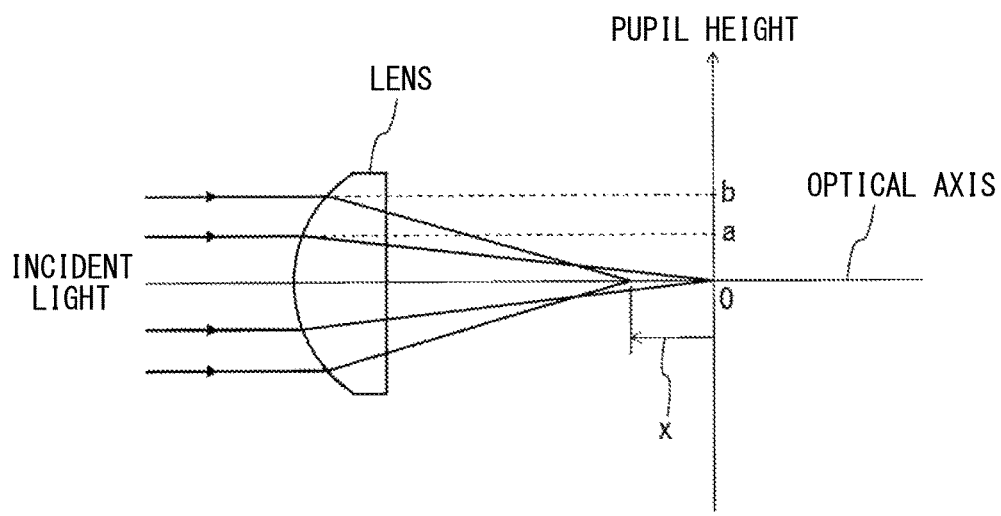
FIG. 6 is an explanatory diagram schematically showing a relation between a spherical aberration of a lens and a pupil height.

FIG. 6 is an explanatory diagram schematically showing a relation between a spherical aberration x of a lens and a pupil height. The spherical aberration x of the lens is deviation on an optical axis caused because light made incident along an optical axis is refracted on a lens surface and focused on a different position depending on a pupil height. The pupil height is an incident height of the incident light and corresponds to the distance from the optical axis (the center axis) of the lens. When a focusing position is present on a side away from the lens with respect to a reference point on the optical axis, correction is excessive. The spherical aberration x has a positive polarity. On the other hand, when the focusing position is present on a side close to the lens with respect to the reference point on the optical axis, correction is insufficient. The spherical aberration x has a negative polarity.

For example, in the case of a convex lens, a focusing position of incident light at a large pupil height (a pupil height "b") is formed further on the lens side than a focusing position of incident light at a small pupil height (a pupil height "a"). The spherical aberration x is smaller than 0 (<0). The spherical aberration x is different depending on the wavelength of incident light.

FIGS. 7A and 7B are diagrams showing a relation between the spherical aberration x and the pupil height concerning different three wavelengths of incident light. The spherical aberration x for each pupil height is shown in a longitudinal aberration display form. In the longitudinal aberration display form, the horizontal axis represents the spherical aberration x and the vertical axis represents the pupil height.

In FIG. 7A, the relation in the case of the diffraction lens 212 is shown. In the case of the diffraction lens 212, the spherical aberration x has a positive polarity and is larger as the pupil height is larger. The spherical aberration x is smaller as the wavelength of incident light is larger. Maximums $x_1$ to $x_3$ of the spherical aberration x at respective wavelengths are in a relation of $x_1 < x_2 < x_3$.

In FIG. 7B, the relation in case of the refraction lenses 211, 213, and 214 is shown. In the case of the refraction lenses 211, 213, and 214, the spherical aberration x has a negative polarity and is larger as the pupil height is larger. The spherical aberration x is smaller as the wavelength of incident light is larger. Maximums $(-x_4)$ to $(-x_6)$ of the absolute value of the spherical aberration x at respective wavelengths are in a relation of $(-x_4) < (-x_5) < (-x_6)$.

If a wavelength band corresponding to the measurement range MR is referred to as wavelength region in use, the diffraction lens 212 is optimized for incident light having a wavelength outside the wavelength region in use. That is, the diffraction lens 212 is optically designed such that the spherical aberration x is as small as approximately 0 with respect to incident light having a wavelength larger than the wavelength region in use.

When such a diffraction lens 212 is used, the polarities of the spherical aberrations x are different in the diffraction lens 212 and the refraction lenses 211, 213, and 214 and absolute values of the spherical aberrations x at the respective wavelengths are the same degree. Therefore, it is possible to cancel the spherical aberrations x of the refraction lenses 211, 213, and 214 over the wavelength region in use.

It is difficult to completely remove the spherical aberrations x of the refraction lenses 211, 213, and 214 with optical design of the lenses. Therefore, it is desirable to combine the refraction lenses 211, 213, and 214 with the diffraction lens 212 optimized outside the wavelength region in use.

According to this embodiment, the spherical aberrations x of the diffraction lens 212 and the refraction lenses 211, 213, and 214 are cancelled making use of the fact that the polarities of the spherical aberrations x are different in the lenses. Therefore, it is possible to prevent the spherical aberrations x over a wide wavelength band.

Since the spherical aberration x of the refraction lens 211 is prevented, it is possible to facilitate optical design of the optical member 21 including the diffraction lens 212. In particular, since the spherical aberrations x can be adjusted according to the refraction lenses 211, 213, and 214, it is possible to further facilitate the optical design of the optical member 21.

Note that, in this embodiment, the example is explained in which the optical member 21 is configured by the diffraction lens 212 and the refraction lenses 211, 213, and 214. However, the present invention does not limit the configuration of the optical member 21 to this. For example, the optical member 21 may be configured by two or more diffraction lenses and one or more refraction lenses.

Figure 8:
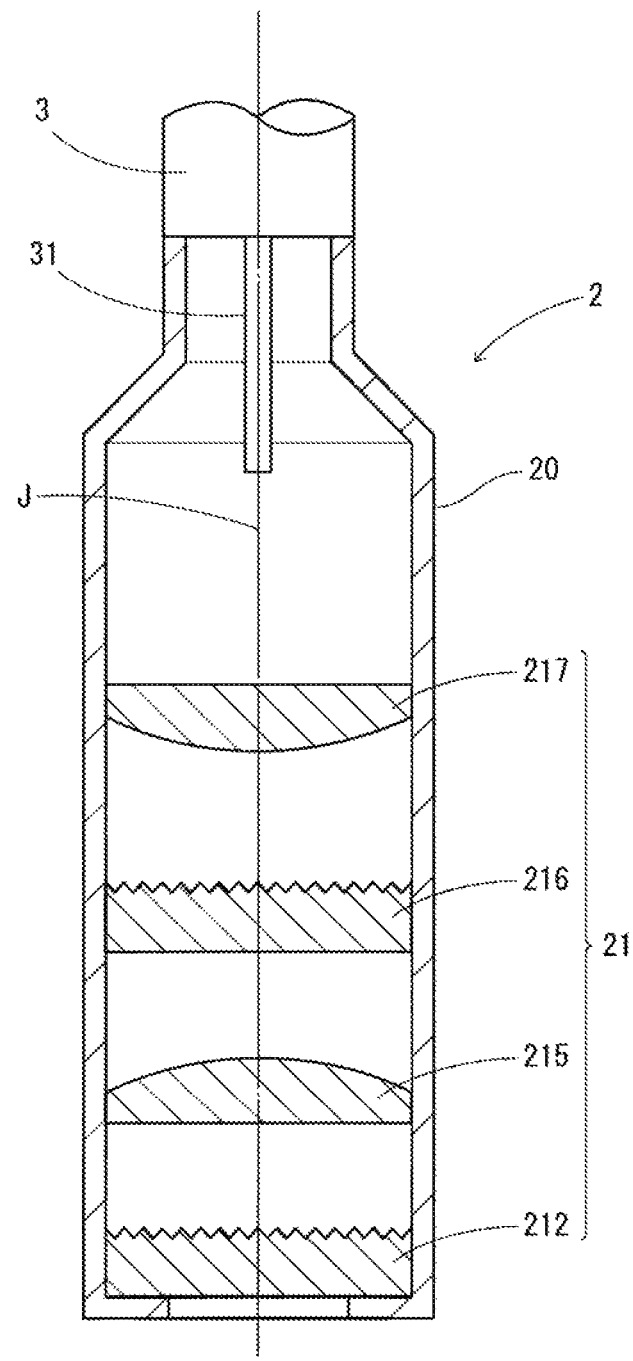
FIG. 8 is an explanatory diagram schematically showing another configuration example of the confocal displacement sensor.

FIG. 8 is an explanatory diagram schematically showing another configuration example of the confocal displacement sensor 1. The head unit 2 including two diffraction lenses 212 and 216 and two refraction lenses 215 and 217 is shown. The optical member 21 in the head unit 2 is configured by the diffraction lenses 212 and 216 and the refraction lenses 215 and 217.

The diffraction lens 212, the refraction lens 215, the diffraction lens 216, and the refraction lens 217 are arrayed in this order. The refraction lenses 215 and 217 are optical lenses that refract detection light.

The diffraction lens 212 is disposed substantially coaxially with the refraction lens 215 and disposed in a position most distant from the emission end of the optical fiber 31 in the optical member 21. The diffraction lens 216 is the same optical element as the diffraction lens 212 shown in FIG. 2. The diffraction lens 216 is disposed further on the emission end side of the optical fiber 31 than the refraction lens 215 in a state in which the center axis is aligned with the optical axis J. The refraction lens 217 is an optical lens opposed to the emission end of the optical fiber 31 and is disposed in a position closest to the emission end of the optical fiber 31 in the optical member 21.

The diffraction lenses 212 and 216 are optimized such that the spherical aberrations thereof are cancelled over the wavelength region in use. The refraction lenses 215 and 217 are designed such that axial chromatic aberrations and spherical aberrations decrease. The diffraction lenses 212 and 216 are desirably optimized at the center wavelength of the wavelength region in use to reduce a degree of the cancellation.

In this embodiment, the example of the spectroscope 43 of the reflection type is explained. However, the present invention does not limit the configuration of the spectroscope to this. For example, a spectroscope of a transmission type that spectrally disperses incident light into a different wavelength component according to a transmission angle may be used.

Figure 9:
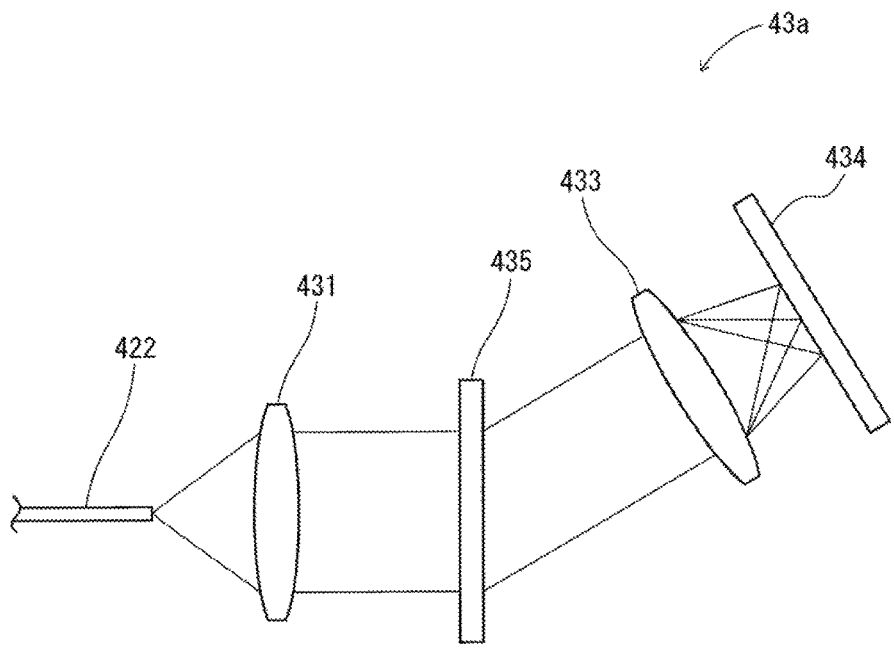
FIG. 9 is an explanatory diagram schematically showing another configuration example of the confocal displacement sensor and showing a spectroscope of a transmission type.

FIG. 9 is an explanatory diagram schematically showing another configuration example of the confocal displacement sensor 1 and showing a spectroscope 43a of the transmission type. The spectroscope 43a is different from the spectroscope 43 shown in FIG. 5 in that a diffraction grating 435 is the transmission type. The diffraction grating 435 is a color dispersing element that spectrally disperses incident light into a different wavelength component according to a transmission angle.

The detection light DL emitted from the emission end of the optical fiber 422 is made incident on the diffraction grating 435 via the collimator lens 431. The detection light DL transmitted through the diffraction grating 435 is made incident on the image sensor 434 via the imaging lens 433.

In this embodiment, the example is explained in which the end face of the optical fiber 31 for transmitting the light of the light source for light projection 41 to the head unit 2 is caused to function as the pinhole of the confocal optical system. However, the present invention can also be applied to a confocal displacement sensor in which light of a light source for light projection is guided to a pinhole without using an optical fiber and detection light reflected by the measurement object W and passed through the pinhole is guided to the spectroscope 43.

What is claimed is:

1. A confocal displacement sensor that measures displacement of a measurement object using a confocal optical system, the confocal displacement sensor comprising:
   a light source for light projection configured to generate light having a plurality of wavelengths;
   a pinhole configured to emit detection light by allowing the light emitted from the light source for light projection to pass;
   an optical member configured to generate an axial chromatic aberration in the detection light emitted via the pinhole and converge the detection light toward the measurement object;
   a measurement control section configured to calculate displacement of the measurement object on the basis of, in the detection light irradiated on the measurement object via the optical member, detection light passed through the pinhole by being reflected while focusing on the measurement object; and
   a head housing configured to house the pinhole and the optical member, wherein
   the optical member includes a first diffraction lens configured to diffract the detection light and a first refraction lens configured to refract the detection light, and
   the first diffraction lens is disposed with a non-diffraction surface exposed from the head housing.

2. The confocal displacement sensor according to claim 1, wherein the first refraction lens is configured from an aspherical lens, a lens surface of which is aspherical.

3. The confocal displacement sensor according to claim 1, wherein the optical member includes a second diffraction lens or a second refraction lens disposed substantially coaxially with the first refraction lens and disposed further on the pinhole side than the first refraction lens.

4. The confocal displacement sensor according to claim 3, wherein the first refraction lens is configured from an aspherical lens, a lens surface of which is aspherical.

5. The confocal displacement sensor according to claim 1, further comprising a fiber cable including an optical fiber for transmitting the light emitted from the light source for light projection to the head housing, an end face of the optical fiber functioning as the pinhole.

6. The confocal displacement sensor according to claim 5, wherein the optical member includes a second diffraction lens or a second refraction lens disposed substantially coaxially with the first refraction lens and disposed further on the pinhole side than the first refraction lens.

7. The confocal displacement sensor according to claim 5, wherein the head housing includes an opening frame section that surrounds the first diffraction lens and projects further to the measurement object side than the non-diffraction surface.

8. The confocal displacement sensor according to claim 5, wherein the non-diffraction surface of the first diffraction lens is formed of a glass material and a diffraction surface having undulation of the first diffraction lens is formed of a resin material.

9. The confocal displacement sensor according to claim 1, wherein the head housing includes an opening frame section that surrounds the first diffraction lens and projects further to the measurement object side than the non-diffraction surface.

10. The confocal displacement sensor according to claim 9, wherein the non-diffraction surface of the first diffraction lens is formed of a glass material and a diffraction surface having undulation of the first diffraction lens is formed of a resin material.

11. The confocal displacement sensor according to claim 1, wherein the non-diffraction surface of the first diffraction lens is formed of a glass material and a diffraction surface having undulation of the first diffraction lens is formed of a resin material.

* * * * *